May 12, 1936.                S. R. LARGE                2,040,489

ANTIFRICTION BEARING

Filed Dec. 14, 1933

INVENTOR:
SAMUEL R. LARGE,
BY
HIS ATTORNEY.

Patented May 12, 1936

2,040,489

UNITED STATES PATENT OFFICE 2,040,489

ANTIFRICTION BEARING

Samuel Robert Large, Bristol, Conn., assignor, by mesne assignments, to General Motors Corporation, Detroit, Mich., a corporation of Delaware Application December 14, 1933, Serial No. 702,272

7 Claims. (Cl. 308—174)

This invention relates to antifriction bearings and comprises all of the features of novelty herein disclosed. An object of the invention is to provide an improved bearing for taking radial and thrust loads, especially a heavy radial load accompanied by a light or intermittent thrust load. Another object is to provide an improved ball and roller bearing unit. Another object is to provide an improved closure or seal for bearings.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a cross sectional view of a bearing.

Figure 1:
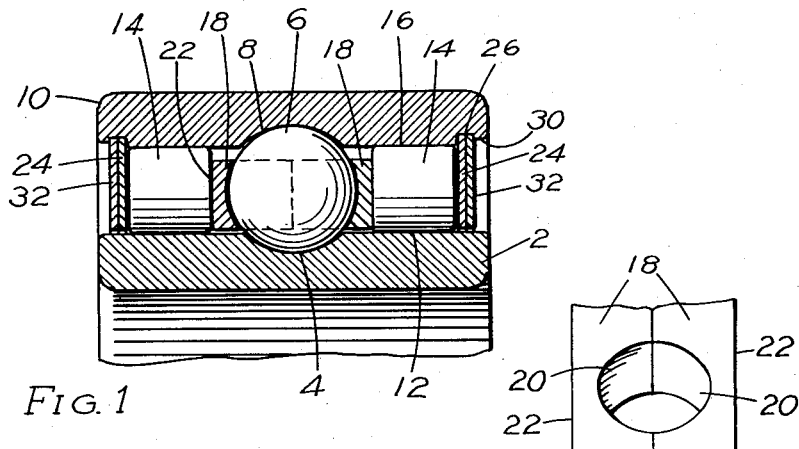
Figure 3:
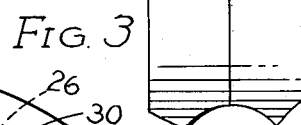
Fig. 3 is a plan view of a portion of a separator.
Figure 2:
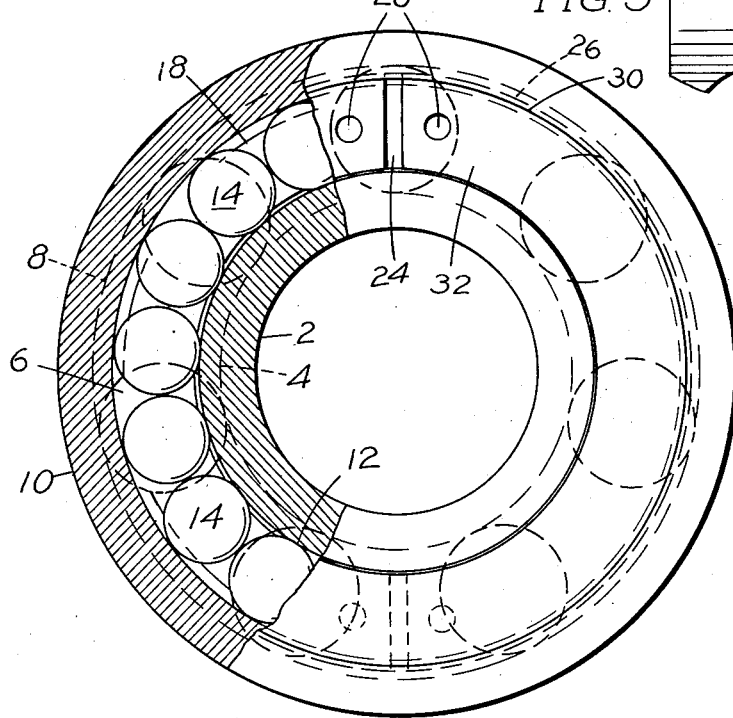
Fig. 2 is a side view with parts broken away and in section.

The numeral 2 indicates an inner race ring having a raceway groove 4 for a row of thrust-resisting rolling elements herein shown as balls 6. The balls also engage a similar raceway groove 8 in an outer race ring 10. At each side of the raceway groove 4, the inner race ring has a raceway 12 for co-operation with a row of rolling elements 14 which engage a corresponding raceway 16 on the outer race ring. The rollers 14 and their raceways are preferably cylindrical and the rollers are in a compact circular series in order to take a heavy radial load. The balls 6 are not intended to take a radial load, their raceways preferably having a very small radial clearance or at least no pressure contact when the balls are in the neutral position of the race rings. However the raceway curvatures have a slightly larger radius than that of the balls so that a goodly thrust load can be taken when axial displacement of the race rings places the balls in angular contact relation to the raceways.

The balls 6 are assembled in their grooves by the well known method of eccentric displacement and are held apart by a separator comprising a pair of rings 18 having mating recesses or half pockets 20 for the balls. The separator rings abut against one another between the balls so that the balls are not squeezed and the outer lateral surfaces 22 of the separator rings present continuous annular guides or retainers for the adjacent rows of rollers 14. The rollers 14 are guided or retained at their outer ends by inner end rings 24 which enter grooves 26 in the outer race ring.

The end rings 24 are preferably split, their adjacent ends being provided with recesses or holes 28 so that the rings can be contracted by a suitable tool to pass them inside of an overhanging retaining rib or land 30. To completely close the space between the race rings, as to retain lubricant, outer split rings 32 are sprung into the grooves 26, the joints between them preferably being arranged diametrically opposite to the joints of the inner rings. Each outer ring backs up and stiffens the inner one and is more easily contracted than a single thick ring while each mating ring closes the joint in the other.

There is a little space or end play between the rollers 14 and the adjacent guide surfaces so that external thrust load will come on the balls 6 without first coming on the rollers and their guides. The bearing is a self-contained unit which is symmetrical about a center line and is particularly adapted for installations wherein an oscillating or slowly rotating member transmits a heavy radial load and a light or occasional thrust load to a co-operating member. The centers of the rolling elements of all rows are at the same distance from the bearing axis so that there is no material wear or injurious rubbing of the rollers against the separator. The balls are assembled first, by the eccentric displacement method; the separator rings are then slipped into place axially and require no fastening; the rollers are next inserted and retain the separator rings; finally the end rings maintain all the parts together. Machining of the bearing is easy and economical because the cylindrical raceways can be machined together from the usual straight surfaces outside of the ball groove.

I claim:

1. In an antifriction bearing, an inner race ring, an outer race ring, mating grooves in the rings, a row of balls engaging the grooves, co-operating raceways at each side of the row of balls, rows of rollers engaging said co-operating raceways, a separator having pockets for the balls and lateral guide surfaces for the rollers, and end rings carried by one of the race rings to engage the outer ends of the rollers; substantially as described.

2. In an antifriction bearing, an inner race ring, an outer race ring, a row of rolling elements between the race rings, one of the race rings having a groove with side walls at the side of the row of rolling elements, and a pair of split retaining rings engaging one another in flatwise contact and having their edges fitting between the side walls of the groove, each of the split rings having its ends covered by the other ring; substantially as described.

3. A self-contained bearing unit comprising an inner race ring, an outer race ring, each race ring having a raceway groove and a second raceway surface extending laterally from the edge of the groove, a row of thrust-resisting rolling elements in the grooves, a row of rolling elements of another kind at one side of the thrust-resisting rolling elements and fitting between said second raceway surfaces, and means fitting between the rows of rolling elements and carried by one row while engaging the ends of the rolling elements of the other row to provide a lateral guide therefor; substantially as described.

4. A self-contained bearing unit comprising an inner race ring, an outer race ring, each race ring having a raceway groove and a second raceway surface extending laterally from the edge of the groove, a row of thrust-resisting rolling elements in the grooves, a row of rolling elements of another kind at one side of the thrust-resisting rolling elements and fitting between said second raceway surfaces, means fitting between the rows of rolling elements and carried by one row while engaging the adjacent ends of the rolling elements of the other row to provide a lateral guide therefor, and one of the race rings having a ring providing a second lateral guide for the other ends of the rolling elements; substantially as described.

5. A self-contained bearing unit comprising an inner race ring, an outer race ring, each race ring having a raceway groove and a second and straight raceway surface extending laterally from the edge of the groove, a row of balls in the raceway grooves and being of a size to have no pressure contact with the grooves when the bearing is in a neutral position, a row of cylindrical rollers fitting between the straight raceway surfaces at the side of the row of balls, said rollers taking all of the radial load, means to guide opposite ends of the rollers, the rollers having end play between the guides whereby thrust load will shift the balls into pressure contact with the grooves without transmitting thrust load to the rollers; substantially as described.

6. A self-contained bearing unit comprising an inner race ring, an outer race ring, each race ring being in one piece and having a central raceway groove and being of substantially uniform thickness at each side of the groove to provide additional mating raceways which are closer together than the grooved surfaces, a row of balls in the grooves, and a row of rollers at each side of the balls and having a smaller diameter than the balls; substantially as described.

7. In an antifriction bearing, an inner race ring, an outer race ring, each race ring being in one piece and having a raceway groove confronting a raceway groove in the other race ring, a row of balls engaging the grooves to transmit thrust load in two directions, a pair of co-operating raceways in the rings at the side of the row of balls, said raceways meeting the terminal edges of the raceway grooves, a row of rollers between said pair of co-operating raceways and being of smaller diameter than the balls, and a separator having pockets for the balls, the separator having lateral guide surfaces directly engaging the ends of the rollers and guiding them; substantially as described.

SAMUEL ROBERT LARGE.